United States Patent [19]
Chester

[11] 3,865,428
[45] Feb. 11, 1975

[54] WINDOW SHADE FOR A VEHICLE OR THE LIKE

[76] Inventor: Carroll W. Chester, 1932 E. 76th Pl., Los Angeles, Calif. 90001

[22] Filed: Dec. 19, 1973

[21] Appl. No.: 426,221

Related U.S. Application Data

[63] Continuation-in-part of Ser. No. 305,872, Nov. 13, 1972, abandoned.

[52] U.S. Cl.............................. 296/97 G, 296/97 K
[51] Int. Cl.............................................. B60j 3/02
[58] Field of Search.... 296/97 R, 97 C, 97 G, 97 H, 296/97 K

[56] References Cited
UNITED STATES PATENTS

| | | | |
|---|---|---|---|
| 1,969,887 | 8/1934 | Flanary | 296/97 G |
| 1,995,969 | 3/1935 | Donnelly | 296/97 K |
| 2,932,539 | 4/1960 | Galbraith | 296/97 G |
| 3,029,103 | 4/1962 | Horrocks | 296/97 G |
| 3,122,393 | 2/1964 | Moody | 296/97 G |
| 3,403,937 | 10/1968 | Quaine | 296/97 G |

FOREIGN PATENTS OR APPLICATIONS

| | | | |
|---|---|---|---|
| 1,407,244 | 6/1965 | France | 296/97 G |
| 567,958 | 3/1945 | Great Britain | 296/97 G |

*Primary Examiner*—Albert J. Makay
*Assistant Examiner*—Leslie J. Paperner
*Attorney, Agent, or Firm*—Phillips, Moore, Weissenberger, Lempio & Strabala

[57] ABSTRACT

A window shade for a vehicle or the like is disclosed which is removably attachable to the vehicle door window opening. The shade is readily swingable from a position covering a portion of the window when closed to a position extending outwardly and upwardly at an angle thereto when the window is opened and it is desired to have access outwardly thereof. The shade then returns automatically to its previous position. The shade is also slidable in a horizontal direction to give a greater range of protection to the driver of the vehicle.

10 Claims, 6 Drawing Figures

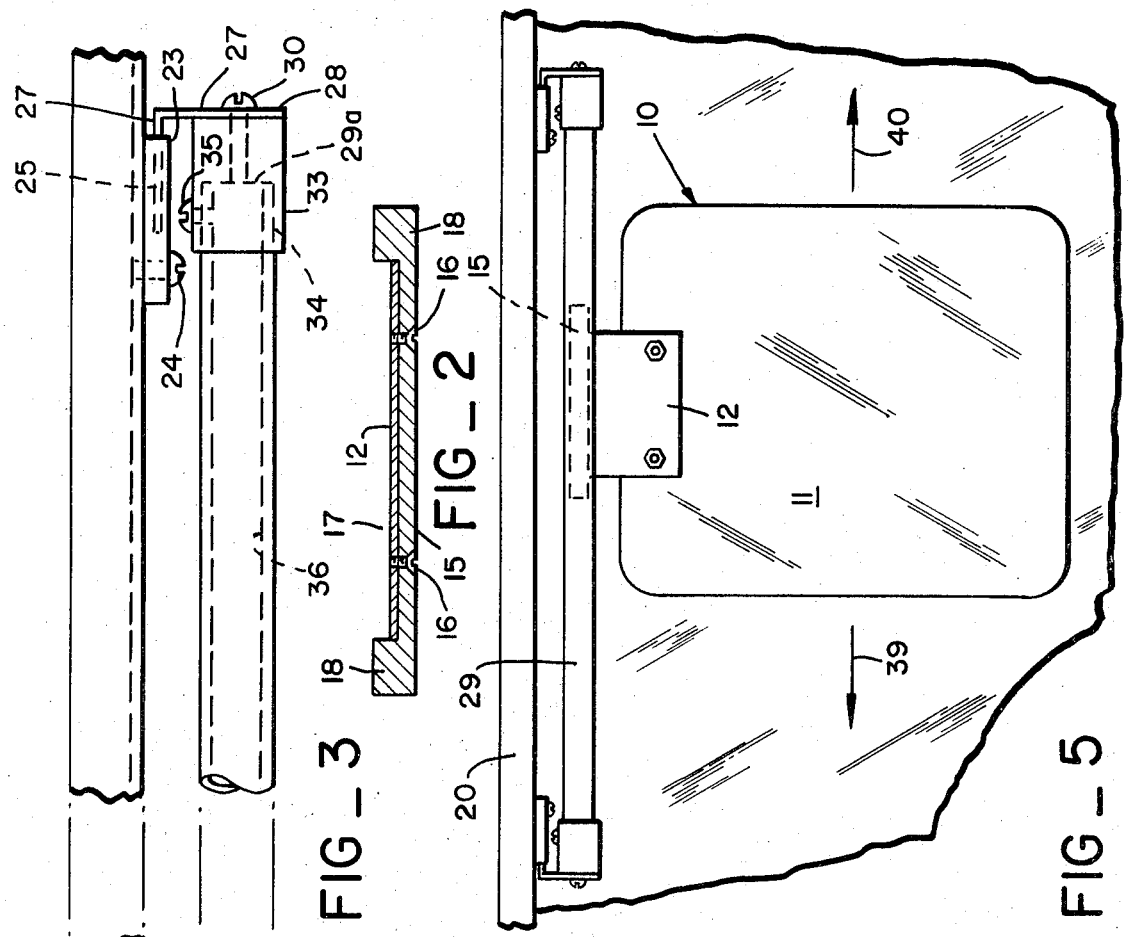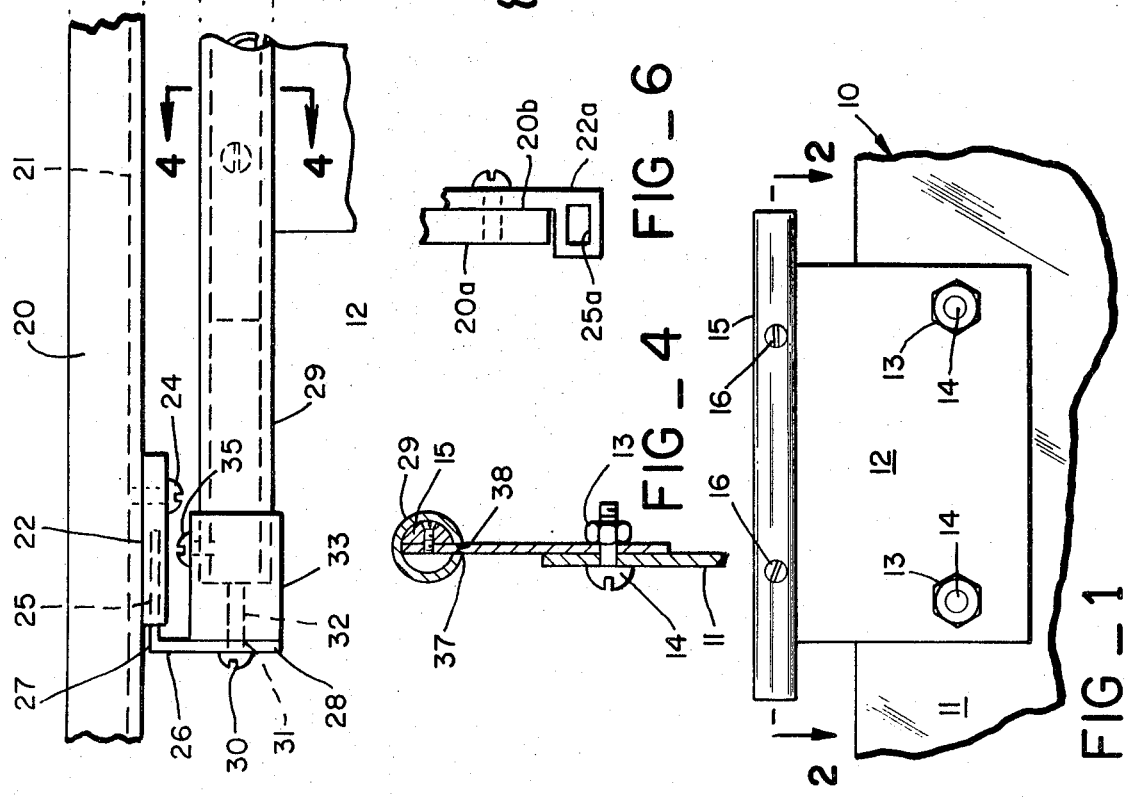

3,865,428

WINDOW SHADE FOR A VEHICLE OR THE LIKE

CROSS-REFERENCE TO RELATED APPLICATION

This application is a continuation-in-part of U.S. Patent Application Ser. No. 305,872, filed Nov. 13, 1972 by the same inventor and under the same title, and now abandoned.

BACKGROUND OF THE INVENTION

1. Field of the Invention

The invention relates to window shades; and, more particularly, to a shade for the window of a vehicle or the like.

2. Description of the Prior Art

Various types of shades have been suggested for car windows or the like to protect the car occupants from sun rays. However, the particular means for mounting such shades are generally complex and require much drilling or the like to install. Further, certain such shades may be affected by the slip stream caused by the moving car. Finally, such prior art shades interfere with the necessity for the driver or other occupant of the vehicle to put his head or arm out of an open window. If the shade is merely raised as in some models, readjusting is required for proper cutting off of the sun's rays.

Thus, there are times when a driver does not change the angle of his face with respect to the sun's rays for considerable periods of time. The sun's rays, during long periods of exposure — especially in early morning or late afternoon sun — can cause serious skin problems in many people.

There thus exists a need for a shade which can be quickly and easily mounted on the existing frame of a vehicle window, moved into and out of interference therewith and not be affected by the slip stream caused by the vehicle's motion.

SUMMARY OF THE INVENTION

It is an object of this invention to provide a shade for the window of a vehicle or the like which can be quickly and easily mounted thereon.

It is a further object of this invention to provide such a shade which can be moved out of shading position, then automatically return to its previous position.

It is still a further object of this invention to provide such a shade which can be either horizontally or vertically adjusted when in position on the vehicle window, particularly to compensate for vehicle windows which are at an angle with respect to the vertical.

These and other objects are preferably accomplished by providing a shade structure which is removably attachable to the vehicle door window opening. The shade member of the structure is resilient to enable it to bend from a position covering a portion of the window when closed to a position extending outwardly and upwardly at an angle thereto when the window is opened and it is desired to have access outwardly thereof. The shade then returns automatically to its previous position. The shade is also slidable in a horizontal direction to give a greater range of protection to the driver of the vehicle.

BRIEF DESCRIPTION OF THE DRAWING

FIG. 1 is a fragmentary view in elevation of the shading member and mounting support therefor of the shade structure of my invention;

FIG. 2 is a fragmentary cross-section view taken along line 2—2 of FIG. 1;

FIG. 3 is an elevational view of the support bracket of the shade structure of my invention illustrated as mounted on the upper portion of the frame of a car window with a fragmentary portion of the shade member shown in supported position thereon;

FIG. 4 is a view taken along lines 4—4 of FIG. 3 with portions thereof omitted for convenience of illustration and the shading member and mounting support of FIG. 1 installed thereon;

FIG. 5 is a reduced elevational view of the final installation of the shade structure of my invention on a car window; and FIG. 6 is a side view of a modified installation for the shade structure of my invention.

DESCRIPTION OF THE PREFERRED EMBODIMENT

Referring now to FIG. 1 of the drawing, a shade assembly 10 is shown prior to the mounting thereof on the window opening of a vehicle. Assembly 10 includes a shading member 11 which can be of any suitable resilient material, e.g., a tinted material, rigid enough to hold its shape and withstand continual use. Thus, the material of the shading member 11 is preferably a clear transparent thin plastic sheet dyed or colored with a transparent pigment to a neutral shade to absorb a portion of the sun's radiation, and particularly the heat radiation. With such a transparent material the person's view through it is clear, being only partially darkened and not obstructed; and the member 11, occupying only a fraction of the window area opposite the eyes, leaves the remainder of the view perfectly clear. Thus, by moving the member 11 along a carrier to keep it between the face and the sun, the face is completely protected and the field of vision is not obscured, as will be explained more fully hereinbelow.

A generally flat plate or sheet 12 of spring steel about 0.012 inch in thickness overlaps and is secured to one face of the shading member 11 by any suitable means, such as nuts 13 fastened to bolts 14 extending through suitable apertures in the shading member 11 and sheet 12. It will be seen that the opposed major surfaces of the sheet 12 are of substantially smaller area than the opposed major surfaces of the shading member 11. A shade support plug 15 is rigidly connected to the free portion of the sheet 12 as by means of a pair of screws 16.

Referring to FIGS. 2 and 4, it will be seen that the shade support plug 15 is a circular rod having a portion removed intermediate its ends to form a notch indicated at 17 leaving end portions 18 thereof intact. The bottom of the notch 17 preferably lies substantially along the axis of the plug and is flat to provide for maximum contact area between the sheet 12 and the bottom of the notch 17.

As shown in FIG. 1, the sheet 12 may be a square of spring steel about 1¾ inch on a side. The shade support plug may be made from a rod about five-sixteenths inch in diameter and 2½ inches in length. The shading member 11 supported thereby may be a sheet of plastic material about 6¾ inches or so in overall width (i.e., the horizontal direction when in use), about 8 inches or so in overall length and about one thirty-second second inch in thickness. I have found these dimensions to be suitable for accommodating my invention to conventional sized window openings of most vehicles, such as automobiles or the like.

Referring now to FIG. 3, an elevational view is shown of the conventional window frame 20 of a car door or the like (not shown). Of course, the configuration and dimensions of such frames are not uniform; however, variations thereof may be compensated for by any suitable method of mounting. In fact, my device can be secured at any suitable location inside the vehicle and in conjunction with one or more windows thereof.

As can be seen in FIG. 3, frame 20 has a downwardly extending flange portion 21 (shown in dotted lines) to which I propose to mount at least a pair of bracket keepers 22 and 23. Bracket keepers 22 and 23 may be secured in place by one or more conventional screws 24 or the like. Each keeper 22 and 23 has a slotted aperture 25 extending part way therethrough. As can clearly be seen in FIG. 3, the apertures 25 for brackets 22 and 23 are in the extreme outer ends thereof.

A pair of generally L-shaped support brackets 26 and 27 are shown mounted in keepers 22 and 23 by having one end 27 disposed in aperture 25 therein. The other end 28 thereof extends downwardly generally normal thereto.

A generally tubular member 29 having caps 33 on each end thereof is secured to ends 28 of brackets 26 and 27. Thus, suitable machine screws 30 or the like may pass through apertures 31 in brackets 26 and 27 and into like apertures 32 in end caps 33. Member 29 is secured within sockets 34 formed in end caps 33 by means of machine screws 35 or the like which pass through both caps 33 and the free ends of tubular member 29.

As can be seen in both FIGS. 3 and 4, member 29 is hollow with a longitudinal slot 36 extending therealong. In keeping with the preferred dimensions given hereinabove, member 29 may be about 12 inches in overall length with slot 36 about 0.015 inch or so in width. Member 29 may also be about one-half inch or so in overall diameter and five-sixteenths inch or so in inner diameter.

As illustrated in FIG. 4 the shade support plug 15 is disposed within the hollow tubular member 29 coaxially therewith and with the sheet 12 projecting through the longitudinal slot 36 formed in the member 29. That is, the entire assembly 10 illustrated in FIG. 1 may be assembled with the FIG. 2 apparatus by inserting the support plug 15 into the hollow tubular member and the sheet 12 into the slot 36 from one end thereof. Of course, this is accomplished prior to securing member 29 within end caps 33.

It will be understood that the diameter of the support plug 15 is slightly less than the inner diameter of the hollow tubular member 29 and that the thickness of the sheet 12 is slightly less than the width of the slot 36. Thus, since the overall length of the support plug 15 is appreciably less than the overall length of the hollow tubular member the assembly 10 may be slid back and forth along the tubular member 29. Thus, the position of the shading member 11 can be readily adjusted in a horizontal direction and will tend to remain where placed due to the friction between the support plug and the inner surface of the tubular member 29.

Further, the sheet 12 is loosely restrained between the edges 37 and 38 of slot 36 thus preventing rotation of the support plug 15 about its own axis in response to forces applied to shading member 11 having components normal to the major surfaces thereof. However, the shading member 11 and sheet 12 of the spring steel are resilient enough to bend or flex in a direction transverse to their major surfaces in response to forces having a component normal to such major surfaces, as for example, forces exerted on the shading member by contact of the human hand at a point thereon. Preferably, when the free end of the shading member 11 bends through an arc of about 25° due to transverse force applied thereto the lower edge of sheet 12 should bend through an arc of about 15°. Greater force will, of course, cause both the shading member 11 and the sheet 12 to bend through a larger arc, but when the force is removed the shading member 11 and sheet 12 will return to their normal position as established by the orientation of the slot 36.

Accordingly, the orientation of slot 36 may be varied by turning or rotating member 29 and end caps 33 by loosening screws 30 (which abut against the free ends 29a of member 29 and thus hold it in place), then rotating member 29 to its desired position, and finally retightening screws 30.

The installation of member 29 on the window frame 20 of a car door or the like is shown in FIG. 5. Shading member 11 is movable back and forth along slot 36 as indicated by arrows 39 and 40, respectively. It can be either slid forward or backward to give a greater range of protection to the driver of the vehicle. Since the shading member 11 is installed inside the car, it is not affected by the slip stream caused by vehicle motion unless the window is open and even then the shading member 11 and spring sheet 12 are sufficiently resilient to resist the forces exerted thereon by the pressure of the slip stream under normal conditions. If winds of unusual violence are encountered, the window may be closed at least enough to catch the lower edge of the shading member 11.

If it is necessary for the driver to put his arm or head out of the car window, the shading member 11 can be bent outside of the car window (the window now being open), then automatically return due to the resilience of the shade member 11 and spring sheet 12 to the angle for which it has been previously set. That is, screws 30 are used to set member 29 and thus orient slot 36 in the position desired so that the shading member 11 extends along the inner surface of the window parallel thereto. Thus, the shading member will always be out of the way of the driver.

It will be understood that both the shading member 11 and spring sheet 12 are rigid when subjected to edgewise forces thus enabling them to be used to slide the support plug 15 within the tubular member 29. When not in use, all components but bracket keepers 22 and 23 may be removed from frame 20 by loosening screws 30 until member 29 and end caps 33 are removable from brackets 26, 27. Brackets 26 and 27 may then be removed from keepers 22 and 23.

If frame 20 is too narrow for installation of keepers 22 and 23 thereon, such as narrow frame 20a in FIG. 6, generally L-shaped keepers 22a may be secured by a wider portion of frame 20a, such as the top inside portion 20b thereof, and have the keeper portion (i.e., aperture 25a) extending outwardly normal thereto.

If member 11 is not being actively used by the driver, it may be slid to the rear of the window opening.

It can be seen from the foregoing that I have disclosed a unique shade for the window of a vehicle or the like which can be quickly and easily installed thereon, yet be readily adjustable for compensating for change in the direction of the sun's rays, paying tolls, etc. Further, many present-day vehicles have car windows disposed at an angle from the vertical with respect to the floor of the vehicle. My shade can easily be adjusted to lie in a generally parallel plane with respect to the plane of the car window. The shading of the sun from the face of the driver will make his journey more pleasant without worry of sunburn or the like. Finally, the shade automatically returns to its previous pre-set position due to its resilience after it is bent outwardly for the convenience of the driver.

I claim as my invention:

1. A shade structure for the window of a vehicle or the like comprising:
   a. a first sheet of shade material capable of blocking at least a portion of the light rays impinging thereon, said first sheet having flat opposed major surfaces of smaller area then said window;
   b. a second sheet of resilient material, said second resilient sheet having flat opposed major surfaces of smaller area than the area of said major surfaces of said first sheet, a portion of said second sheet overlying a portion of said first sheet and being fixed to said first sheet with one of said major surfaces of said first sheet in contact with one of said major surfaces of said second sheet;
   c. means mounting said first and second sheets with the major surfaces thereof adjacent the inside surfaces of said window and generally parallel thereto; said means including a hollow tubular member having an axially extending slot in the wall thereof dimensioned to receive a portion of said second sheet therein with a small tolerance, and a plug member slidably received in said tubular member with a portion of said plug member overlying a portion of said second sheet within said tubular member, said second sheet being fixed to said plug member and said tubular member being fixed at its ends to said vehicle,
   said first and second sheets being thin enough to be flexed in a direction transverse of the major surfaces thereof by contact of the human hand at a point on one of the major surfaces of said first sheet and thick enough not to flex in a direction parallel to the major surfaces thereof by forces applied to the edge thereof sufficient to slide said plug within said tubular member.

2. A shade structure as claimed in claim 1 wherein said means mounting said first and second sheets adjacent the inside surface of said window includes a pair of end caps adapted to rotably receive the ends of said tubular member and means for selectively locking said tubular member against rotation within said end caps.

3. A shade structure as claimed in claim 2 wherein said means mounting said first and second sheets adjacent the inside surface of said window includes a pair of apertured bracket keepers and a pair of generally L-shaped brackets, one leg of each of said pair of generally L-shaped brackets being received in a different one of said bracket keepers and means securing the other leg of each of said L-shaped brackets to a different one of said pair of end caps.

4. A shade structure as claimed in claim 3 wherein said means securing the other leg of each of said L-shaped brackets to a different one of said pair of end caps comprises a screw passing through an aperture in said leg of said bracket and engaging a threaded hole in said cap and said means for selectively locking said tubular member against rotation within said end caps comprises a pair of set screws each engaging a threaded hole in a different one of said end caps and passing therethrough into engagement with said tubular member.

5. A shade structure as claimed in claim 4 wherein said bracket keepers are affixed to the upper frame of a side window of said vehicle.

6. A shade structure as claimed in claim 1 wherein said first sheeet of shade material is a sheet of tinted plastic having a thickness of about one thirty-second inch and said second sheet of resilient material is a sheet of spring steel having a thickness of about 0.012 inch.

7. A shade structure as claimed in claim 6 wherein said tubular member has a length of about 12 inches, said first sheet is a rectangle of about 6 inches by eight inches and said second sheet is a square of about 1¾ inch on a side.

8. A shade structure as claimed in claim 6 wherein said slot in said wall of said hollow tubular member has a width of about 0.015 inch.

9. A shade structure as claimed in claim 1 wherein the relative thicknesses of said first and said second sheets are related to each other in such a way that, when said first sheet is flexed to move the free end thereof through an arc of about 25° transversely of the major surfaces thereof, the end of said second sheet which overlaps said first sheet is moved through an arc of about 15°.

10. A shade structure as claimed in claim 1 wherein said tubular member has a circular internal cross section and said plug member has a circular external cross section.

* * * * *